Patented Nov. 15, 1949

2,488,078

UNITED STATES PATENT OFFICE 2,488,078

METHOD OF RECOVERING PHOSPHORUS AND CALCIUM ALUMINATE SLAG FROM PHOSPHORUS-CONTAINING MATERIALS AND ALUMINUM-CONTAINING MATERIALS

Lorentz Angell Conradi, Ole Georg Gjösteen, and Harald Wesenberg, Ardalstangen, Norway No Drawing. Application February 6, 1948, Serial No. 6,826. In Canada September 19, 1946

2 Claims. (Cl. 23—52)

It is known from Patent No. 1,723,791 to extract phosphorus from natural phosphates by melting together natural calcium phosphate, aluminum phosphate and coke, whereby the phosphorus is volatilized as an elementary phosphorus-containing gas and thereby simultaneously obtaining a valuable fusion cement slag.

It is also known in a corresponding way to produce phosphorus and a calcium aluminate slag and to dissolve the alumina compound from the latter for using it in aluminum production.

Thus, when melting together raw materials containing phosphorus and aluminum in an electric furnace with coke, the fact is utilized that $Al_2O_3$ in connection with reducing reagents is capable of replacing the phosphorus in its combinations with calcium forming calcium aluminate. In this electrothermic process is produced elementary phosphorus which is volatilized and ferro-phosphorus which appears as a liquid component by reduction of the combinations of iron present in the charge. The method as described for instance in Norwegian Patent No. 41,453 has until now been used very little, if at all, especially because difficulties arise in connection with the forming of the slag. It is a fact that the important disintegration of the cooled slag-smelt caused by the recrystallisation of the di-calcium-silicate-phase existent in the slag often fails to appear and the yield of the lixiviation of the slag produced is often below what is rationally justifiable.

The present invention is based on an observation made by the applicants that certain impurities in the slag prevent the important disintegration of the slag, with the consequence that the slag does not "crumble," and further cause a reduction of the solubility and thereby the yield of the extraction.

The inventors have now found that it is the regularly existent impurities in the phosphate raw material, viz., fluorine and alkaline metals, which are responsible for these working difficulties. Experiments have proved that said impurities combine with other phases existent in the slag as calcium aluminate and dicalcium silicate to glassy melts. These undefined combinations or compounds prevent the disintegration of the crystals and reduce the reaction of the calcium-aluminate with the leaching means usually employed in the succeeding production of the aluminium oxide. It has furthermore been proved that these undefined combinations impede the reduction itself and the volatilization of the phosphorus.

The object of the present invention is to remove these unfavorable impurities in transforming them into compounds which are volatilizable at the characteristic furnace temperature. Said fluorine alkali metal compounds are valuable by-products, and their volatilization facilitates the recovering of the elementary phosphorus which is simultaneously being produced and volatilized from the furnace.

When producing calcium-aluminate-slag according to the invention using raw materials containing phosphorus and aluminium the impurities detrimental to the disintegration and to the use of the slag, viz., fluorine and alkaline metals are brought to volatilization at the temperatures characteristic for the working of the electric furnace and in a form which is convenient for their further treatment and use by giving the charge such a composition that the molecular-ratio between fluorine and alkali will be between 1.0 and 1.1. Practical experiments as well as theoretical considerations prove in fact that the alkali-metals and fluorine each separately are combined with the other phases existent in the slag-smelt which consist of calcium aluminium silicium combinations in such stabile combinations that these do not show any noteworthy tendency of volatilization under the conditions of temperatures and phases existent during the smelting process. On the other hand the well defined alkali fluoride combinations, where alkali and fluorine are present in the molecular-ratio 1:1 give the most favourable conditions of volatilization at said given conditions of temperature. However, as in this case the most favourable conditions for the volatilization cannot be taken into consideration exclusively, but other observations of importance for the condensation will also have to be taken into consideration, especially the fact that phosphorus under certain conditions may bind itself to alkali forming a volatile alkali combination of unknown composition, which is very detrimental to the condensation of the phosphorus, it has proved to be effective to have a small excess of fluorine in the charge.

Experiments have proved that when this excess of fluorine is kept within a range limited by the molecular-ratio fluorine-alkali 1.0 and 1.1 such forming of phosphorus-alkaline combinations is prevented and at the same time the qualities of the slag is not influenced in an unfavourable direction.

The impurities fluorine and alkali are practically never present with these favourable proportions to each other in the commercial raw materials employed for this smelting-process and as mentioned above the object of the present invention is therefore to procure such conditions during the smelting process.

One may for instance use several different phosphorus-containing raw materials with mutually different content of impurities and so mixed in the charge that the proportion between fluorine and alkali-metal will give the desired molecular-ratio between 1.0 and 1.1 considering the entire charge as a whole. This may be accomplished by using for instance Kola-apatite-concentrate and African raw phosphate, which are different types as to content of impurities, in a mixture fitting the purpose as the phosphorus containing constituent of the charge. One type only of raw phosphate as for instance Wavellite may be used adding the missing part of fluorine or alkali respectively in the form of combinations, where the desired constituent is combined with other for the slag-smelt not detrimental or directly useful constituents.

For a charge with an excess of alkali, fluorspar may for instance be used as means for adding the fluorine, where the content of calcium is utilized as a component of the slag. For a charge an excess of fluorine alkali-combinations may be used as for instance sodium carbonate, labradorite, feldspar or the like, where the content of sodium is utilized for the forming of alkali-fluoride, while the remaining constituents are incorporated as necessary and valuable components of the slag.

Attention is directed to the fact that the desired forming of alkali-fluoride may be quickened and facilitated by catalytic influence upon the splitting of the heavy volatile combinations of alkali-metals or fluorine existing in the slag, so that these may be volatilized in the form of alkali-fluoride. This is thereby obtained that to the charge are added substances which during the melting down might act catalysing. The experiments have proved that aqueous vapour is a conveniently acting catalyst. It may be conceived that the effect is caused by intermediary formation of fluoride of hydrogen according to the equation of reaction:

$$CaF_2 + H_2O = CaO + 2HF$$

whereafter the fluoride of hydrogen formed reacts with the alkali combinations re-forming water and forming the desired alkali-fluoride.

Having described our invention, what we claim and desire to protect by Letters Patent is:

1. The process for recovering phosphorus and calcium aluminate slag from calcium phosphate containing material and alumina containing material, which materials also contain as impurities at least one of the elements fluorine and alkali metals which comprises forming a charge of the said phosphate containing material, said alumina containing material, and coke, adding to said charge sufficient of a material containing at least one of the elements fluorine and alkali metal to adjust the molecular fluorine to alkali metal ratio in the charge to within the range 1.0 to 1.1, and fusing the charge at a temperature high enough to drive off phosphorus and alkali metal fluoride and leave a slag of calcium aluminate, and leaching the aluminate to recover an alkaline aluminate.

2. The process according to claim 1, characterized in that to the charge is added aqueous vapor during the melting down in the electric furnace.

LORENTZ ANGELL CONRADI.
OLE GEORG GJÖSTEEN.
HARALD WESENBERG.

REFERENCES CITED

The following references are of record in the file of this patent:

UNITED STATES PATENTS

| Number | Name | Date |
|---|---|---|
| 1,723,791 | Kyber | Aug. 6, 1929 |